(12) United States Patent
Nagase

(10) Patent No.: US 8,072,199 B2
(45) Date of Patent: Dec. 6, 2011

(54) CONTROL CIRCUIT FOR STEP-DOWN DC-DC CONVERTER, STEP-DOWN DC-DC CONVERTER AND CONTROL METHOD THEREOF

(75) Inventor: Naoki Nagase, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 284 days.

(21) Appl. No.: 12/054,785

(22) Filed: Mar. 25, 2008

(65) Prior Publication Data
US 2008/0278128 A1    Nov. 13, 2008

(30) Foreign Application Priority Data
Mar. 26, 2007   (JP) .................................. 2007-079223

(51) Int. Cl.
*G05F 1/00* (2006.01)
(52) U.S. Cl. ..................................................... 323/282
(58) Field of Classification Search .................. 323/234, 323/265, 282, 284, 285, 290
See application file for complete search history.

(56) References Cited

U.S. PATENT DOCUMENTS

| | | | |
|---|---|---|---|
| 5,627,460 A * | 5/1997 | Bazinet et al. | 323/288 |
| 6,229,289 B1 * | 5/2001 | Piovaccari et al. | 323/268 |
| 7,250,745 B2 * | 7/2007 | Yasukouchi et al. | 323/284 |
| 7,262,587 B2 * | 8/2007 | Takimoto et al. | 323/282 |
| 7,642,762 B2 * | 1/2010 | Xie et al. | 323/282 |
| 2004/0227547 A1 * | 11/2004 | Shiraishi et al. | 327/110 |

FOREIGN PATENT DOCUMENTS

JP   2002-84741   3/2002
JP   2005-174351   6/2005

* cited by examiner

*Primary Examiner* — Adolf Berhane
*Assistant Examiner* — Yemane Mehari
(74) *Attorney, Agent, or Firm* — Fujitsu Patent Center (57) ABSTRACT

To provide a control circuit of a step-down DC-DC converter, a step-down DC-DC converter and a control method thereof which can prevent overshoot and production of a through current flowing to a main switching transistor and a synchronous rectifier transistor by adopting a simple circuit configuration. The control circuit of the step-down DC-DC converter in which a main switching transistor M0 is constituted of a NMOS transistor has a MOS transistor M2 connected between a gate of the main switching transistor M0 and a ground potential and is operable to become conductive in response to an OFF command from the main switching transistor M0.

11 Claims, 6 Drawing Sheets

CIRCUIT DIAGRAM SHOWING CONFIGURATION OF STEP-DOWN DC-DC CONVERTER ACCORDING TO FIRST EMBODIMENT

FIG. 1  BASIC PRINCIPLE DIAGRAM SHOWING OPERATION OF DISCLOSURE

FIG. 2 CIRCUIT DIAGRAM SHOWING CONFIGURATION OF STEP-DOWN DC-DC CONVERTER ACCORDING TO FIRST EMBODIMENT

FIG. 3 TIMING CHART SHOWING OPERATION OF
STEP-DOWN DC-DC CONVERTER ACCORDING TO FIRST EMBODIMENT

FIG. 4 CIRCUIT DIAGRAM SHOWING CONFIGURATION OF STEP-DOWN DC-DC CONVERTER ACCORDING TO SECOND EMBODIMENT

FIG. 5 TIMING CHART SHOWING OPERATION OF STEP-DOWN DC-DC CONVERTER ACCORDING TO SECOND EMBODIMENT

FIG. 6 (PRIOR ART) CIRCUIT DIAGRAM SHOWING CONFIGURATION OF CONVENTIONAL STEP-DOWN DC-DC CONVERTER

US 8,072,199 B2

CONTROL CIRCUIT FOR STEP-DOWN DC-DC CONVERTER, STEP-DOWN DC-DC CONVERTER AND CONTROL METHOD THEREOF

CROSS-REFERENCE TO RELATED APPLICATIONS

This application is based upon and claims a priority from the prior Japanese Patent Application No. 2007-079223 filed on Mar. 26, 2007, the entire contents of which are incorporated herein by reference.

BACKGROUND

1. Field

The disclosure relates to a control circuit for a step-down DC-DC converter, a step-down converter, and a control method thereof. More particularly, it relates to a step-down DC-DC converter in which a main switching transistor includes an NMOS transistor, a control circuit for the step-down DC-DC converter and a control method of the step-down DC-DC converter.

2. Description of Related Art

In the technology disclosed in Japanese Laid-open Patent Publication No. 2002-084741, a series circuit including a resistor 103, a diode D101 and a speed-up capacitor C102 is connected in parallel with a voltage dividing resistor R101 at an output terminal side of a resistor voltage dividing circuit. At the stage when a terminal voltage of resistor R101 reaches or exceeds 1 Vf required for turning on the above diode R101 after start-up, the diode D101 is turned on to thereby start charging the speed-up capacitor C102. The charging voltage of the speed-up capacitor C102 at this time is at most equal to the difference between the terminal voltage of resistor R101 during a voltage stabilizing operation and the 1 Vf, so that the speed-up capacitor C102 is gradually charged even if its capacitance is small. As a result, a change in the voltage division ratio of the resistor voltage dividing circuit is also carried out gradually, thereby preventing output voltage overshoot.

Japanese Laid-open Patent Publication No. 2005-174351 discloses a technology for preventing overshooting and undershooting.

However, the technology described in Japanese Laid-open Patent Publication No. 2002-084741 requires the provision of one resistor element, two diodes and one capacitative element at the exterior, which inevitably increases circuit size. Also, in the event a main switching transistor is constituted of a NMOS transistor and a synchronous rectifier transistor is employed, the OFF timing of the main switching transistor is delayed. As a result, the main switching transistor and the synchronous rectifier transistor become conductive at the same time so that a through current flows therethrough. As a result, the main switching transistor and the synchronous rectifier transistor are likely to be damaged.

SUMMARY

According to an aspect of one embodiment, a control circuit of a step-down DC-DC converter comprising a main switching transistor corresponding to an NMOS transistor, wherein the step-down DC-DC converter comprises a MOS transistor, coupled between a gate of the main switching transistor and a ground potential, conducts in accordance with an OFF command of the main switching transistor, is provided.

BRIEF DESCRIPTION OF THE DRAWINGS

The accompanying drawings, which are incorporated in and constitute a part of this specification illustrate embodiments of the disclosure and, together with the description, serve to explain the objects, advantages and principles of the disclosure.

DETAILED DESCRIPTION OF THE PREFERRED EMBODIMENTS

Hereafter, an embodiment of a control circuit of a step-down DC-DC converter, a step-down DC-DC converter and a control method thereof will be described while referring to FIG. 1 through FIG. 5. The control circuit of a step-down DC-DC converter, a step-down DC-DC converter and a control method thereof can prevent overshooting and production of a through current flowing to the main switching transistor and the synchronous rectifier transistor by using a simple circuit configuration.

Figure 1:
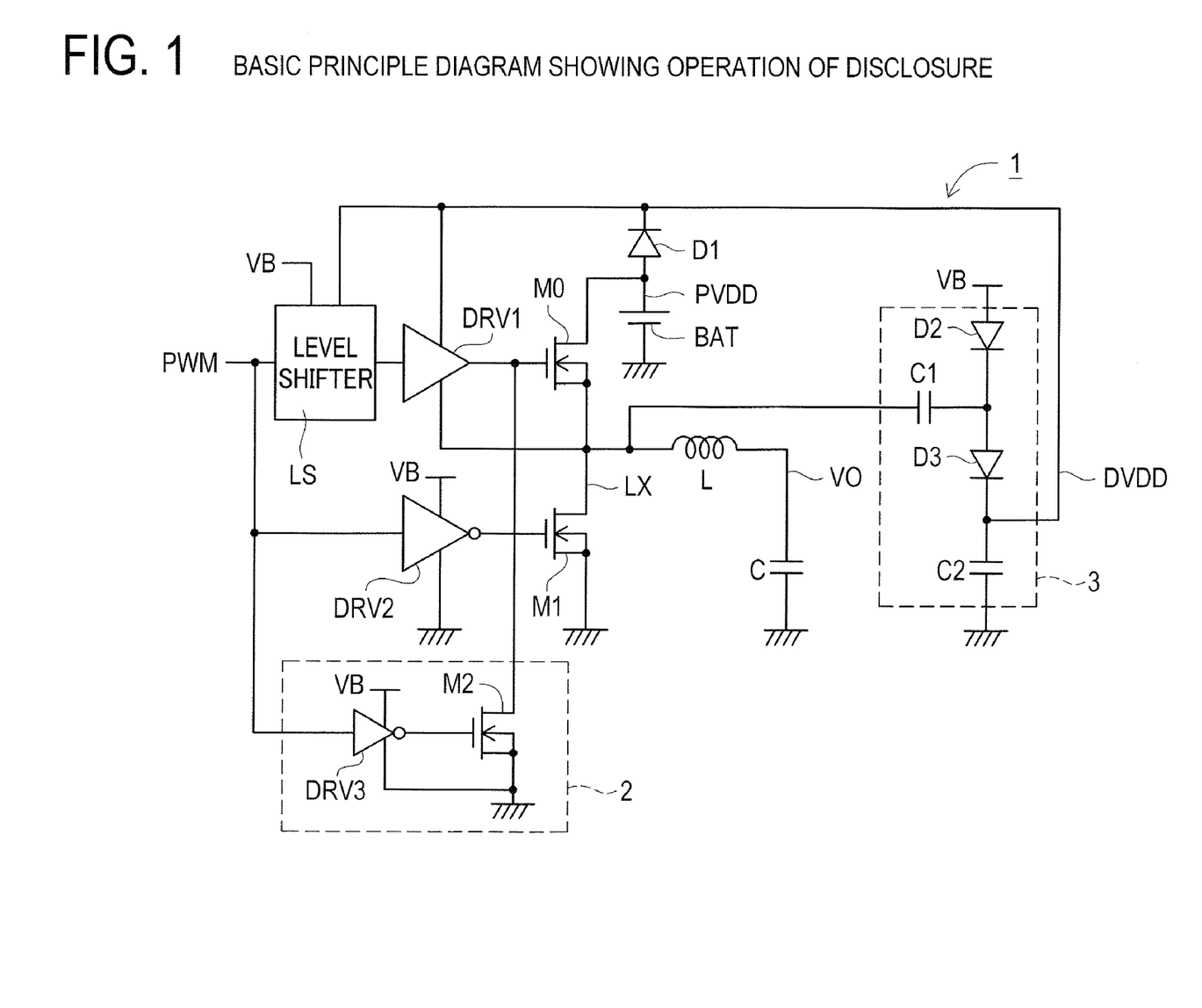
FIG. 1 is a basic principle diagram showing an operation of the disclosure.

FIG. 1 is a view showing the basic principles of the operation according to the disclosure. A step-down DC-DC converter 1 has a coil L, a capacitative element C, a main switching transistor M0, a synchronous rectifier transistor M1, a driver DRV1 for driving the main switching transistor M0, a level shifter LS for converting a high level of the control input signal PWM into a driving voltage of the driver DRV1, and a driver DRV2 for driving the synchronous rectifier transistor M1.

Further, the step-down DC-DC converter 1 has a forced drive circuit 2 consisting of a driver DRV3 having an output thereof connected to a gate of the MOS transistor M2. The MOS transistor M2 has a drain connected to a gate of the main switching transistor M0 and a source connected to the ground potential. The PWM signal is inputted to the level shifter LS, the driver DRV2 and the driver DRV3. The driver DRV1 has a terminal at its power-source side connected to a driving voltage DVDD that is higher than a battery voltage PVDD of a battery BAT, and a terminal at its ground side connected to a connection point LX to which one end of the coil L, the main switching transistor M0 and the synchronous rectifier transistor M1 are connected. The other end of the coil L is connected to the capacitative element C, and an output voltage V0 is outputted from the connection point thereof.

The step-down DC-DC converter 1 has a heretofore known charge pump circuit 3 consisting of a diode D2, a diode D3, a capacitative element C1, and a capacitative element C2. The diode D2 has an anode connected to a power source voltage VB and a cathode connected to one end of the capacitative element C1 and an anode of the diode D3. A cathode of the diode D3 is connected to one end of the capacitative element C2, so that a driving voltage DVDD is outputted from a connection point thereof. The other end of the capacitative element C1 is connected to the connection point LX, and the other end of the capacitative element C2 is connected to the ground potential. As a result, a voltage adding the battery voltage PVDD to the power source voltage VB is outputted from the driving voltage DVDD.

At start-up, the diode D1 supplies a battery voltage PVDD to the driver DRV1. The diode D1 has an anode thereof connected to a plus terminal of battery BAT and a cathode thereof connected to the driving voltage DVDD. This helps prevent a back-flow from the driving voltage DVDD to the battery voltage PVDD after the driving voltage DVDD has risen sufficiently.

Although not shown, the driver DRV1 has two-stage serial inverters comprising a PMOS transistor and a NMOS transistor arranged in series from the battery voltage PVDD towards the ground potential. When the step-down DC-DC converter 1 is turned on, the control input signal PWM transits from a high level to a low level. Here, if the power-source side voltage of the driver DRV1, e.g. the battery voltage PVDD has not risen sufficiently, the voltage to be applied to the Vgs of the NMOS transistor inside the last stage inverter included in the driver DRV1 is insufficient, thereby preventing the output thereof from immediately reaching the level of the connection point LX.

However, since a high level voltage is applied to the gate of the MOS transistor M2, the MOS transistor M2 becomes conductive thereby changing the gate potential of the main switching transistor M0 to a low level.

According to the disclosure, output voltage overshoot, rising of the output voltage up to a voltage level as high as the battery voltage and production of a through current flowing to the main switching transistor and the synchronous rectifier transistor can be prevented at startup of the step-down DC-DC converter by employing a simple circuit configuration.

First Embodiment

Figure 2:
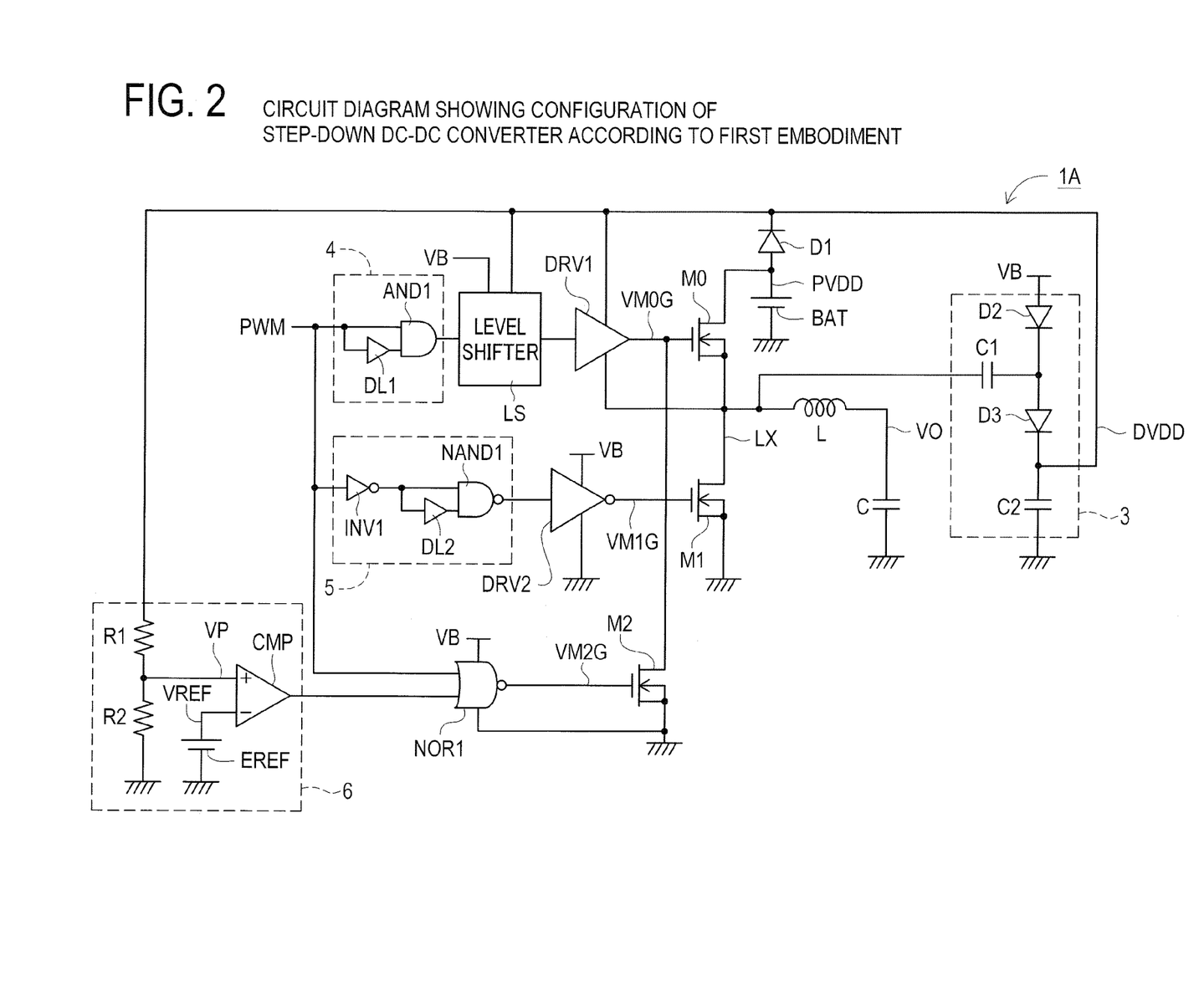
FIG. 2 is a circuit diagram showing a configuration of the step-down DC-DC converter according to a first embodiment.

FIG. 2 is a circuit diagram showing a configuration of a step-down DC-DC converter 1A according to a first embodiment. The step-down DC-DC converter 1A has a drive circuit in which the OFF time of the main switching transistor M0 and the OFF time of the synchronous rectifier transistor M1 are fixed, in other words, a so-called OFF/OFF time fixed-type drive circuit.

The step-down DC-DC converter 1A according to the first embodiment differs from the step-down DC-DC converter 1 shown in the basic principle diagram in that it has a first delay unit 4 for delaying transition of the control input signal PWM to a high level, a second delay unit 5 that delays transition of the control input signal PWM to a low level, a sensing unit 6 that senses that the driving voltage DVDD is equal to or below a predetermined level, and a NOR gate NOR1 that performs a NOR operation on the control input signal PWM and the output of the sensing unit 6. The following text includes description of the above differences only, and description of the similarities with the step-down DC-DC converter 1 will be simplified or omitted.

The first delay unit 4 has a delay element DL1 and an AND gate AND1. The AND gate AND1 has one end of its inputs connected to a control input signal PWM and the other end of its inputs connected to an output of the delay element DL1. The delay element DL1 has an input thereof connected to a control input signal PWM. Thus, if the control input signal PWM transits to a high level, the control input signal PWM is delayed only by a delay time of the delay element DL1.

The second delay unit 5 has an inverter INV1, a delay element DL2 and a NAND gate NAND1. The inverter INV1 has an input connected to a control input signal PWM. The NAND gate NAND1 has one end of its inputs connected to an output of the inverter INV1, and the other end of its inputs connected to an output of the delay element DL2. Further, the delay element DL2 has an input connected to an output of the inverter INV1. Thus, if the control input signal PWM transits to a low level, the control input signal PWM is delayed by a delay time of the delay element DL2.

The sensing unit 6 has a resistive element R1, a resistive element R2, a comparator CMP and a reference voltage EREF. One end of the resistive element R1 is connected to a driving voltage DVDD, and the other end thereof is connected to a non-inversion input of the comparator COMP and one end of the resistive element R2. The resistive element R2 has its other end connected to the ground potential. In other words, the driving voltage DVDD is subjected to resistance voltage division by a proportional division ratio between the resistive element R1 and the resistive element R2, and a resulting drive reference voltage VP which is the voltage at the connection point between these two resistive elements is inputted to the non-inversion input of the comparator CMP. On the other hand, the comparator CMP has an inversion input thereof connected to a reference voltage EREF for outputting a threshold voltage VREF. Thus, if the drive reference voltage VP falls below the threshold voltage VREF, the output of the comparator CMP is a low level, whereas if the drive reference voltage VP exceeds the reference voltage VREF, the output of the comparator CMP transits from a low level to a high level.

The NOR gate NOR1 is connected to a control input signal PWM at one end of its inputs, and to the output of the sensing unit 6 (e.g. the output of the comparator CMP) at the other end of its inputs. Thus, if the drive reference voltage VP falls below the threshold voltage VREF so that a low level voltage is outputted from the comparator CMP, an output obtained by inverting the control input signal PWM is outputted from the NOR gate NOR1. In this case, if the control input signal PWM is at a low level, the gate voltage VM2G of the MOS transistor M2 becomes a high level, so that the MOS transistor M2 becomes conductive. As a result, the gate voltage VM0G of the main switching transistor M0 becomes a low level, so that the main switching transistor M0 becomes non-conductive.

When the driving voltage DVDD rises so that the drive reference voltage VP exceeds the threshold voltage VREF, the output of the comparator CMP transits to a high level and the output of the NOR gate NOR1 is always at a low level. Consequently, the main switching transistor M0 is not influenced after the driving voltage DVDD has risen sufficiently.

Figure 3:
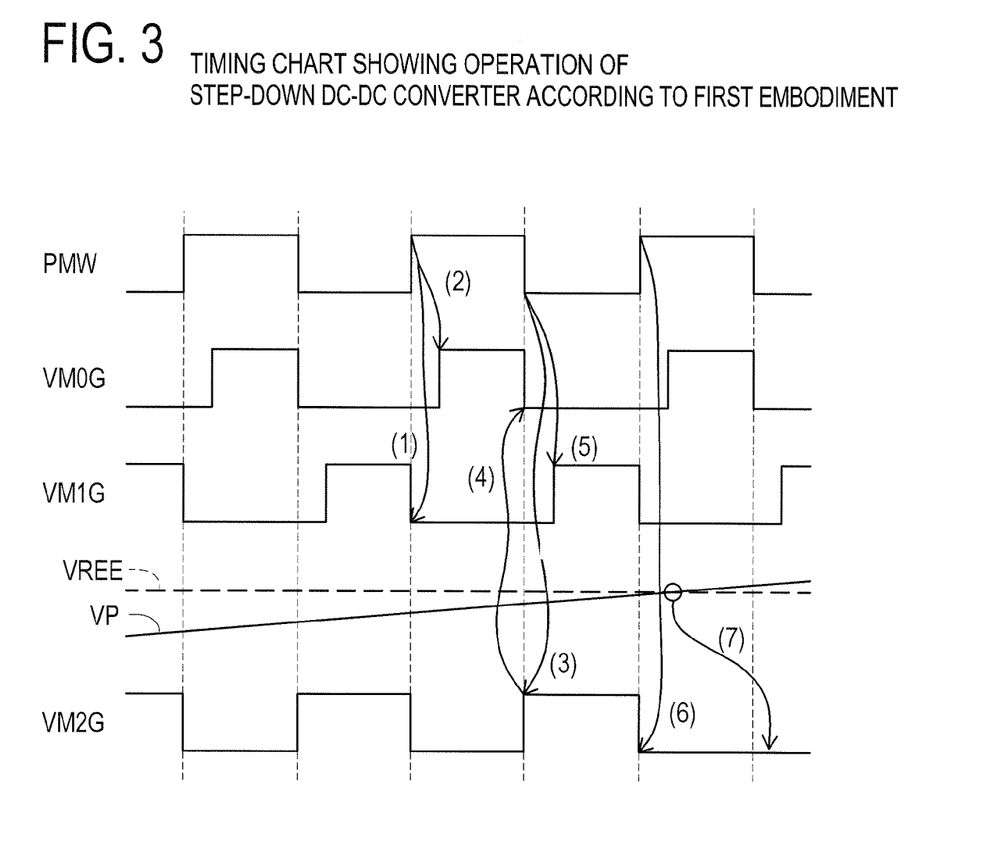
FIG. 3 is a timing chart showing an operation of the step-down DC-DC converter according to a first embodiment.

Next, the operation of the step-down DC-DC converter 1A will be described. FIG. 3 is a timing chart showing an operation of a step-down DC-DC converter 1A according to the first embodiment.

At (1), when the control input signal PWM transits from a low level to a high level, the gate voltage VM1G of the synchronous rectifier transistor M1 transits from a high level to a low level, so that the synchronous rectifier transistor M1 is made non-conductive.

At (2), when the control input signal PWM transits from a low level to a high level, the gate voltage VM0G of the main switching transistor M0 transits from a low level to a high level after the delay time of the delay element DL1 has lapsed, so that the main switching transistor M0 is made conductive. As a result, the battery voltage PVDD of the battery BAT is applied to coil L.

At (3), the drive reference voltage VP falls below the threshold voltage VREF, so that the gate voltage VM2G of the MOS transistor M2 transits from a low level to a high level in response to the control input signal PWM transiting from a high level to a low level.

At (4), the gate voltage VM2G transits from a low level to a high level so that the MOS transistor M2 becomes conductive and the gate voltage VMOG of the main switching transistor M0 transits from a high level to a low level. Thus, in the step-down DC-DC converter 1A of the first embodiment, overshoot of the output voltage, rising of the output voltage up to a voltage level as high as the battery voltage and production of a through current flowing to the main switching transistor and the synchronous rectifier transistor can be prevented from occurring at start-up.

At (5), when the control input signal PWM transits from a high level to a low level, the gate voltage VM1G of the synchronous rectifier transistor M1 transits from a low level to a high level after the delay time of the delay element DL2 has lapsed, so that the synchronous rectifier transistor M1 is made conductive. As a result, the slope of the current flowing to the coil L is reversed to a negative direction.

At (6), when the control input signal PWM transits from a low level to a high level, the gate voltage VM2G of the MOS transistor M2 becomes low level, so that the MOS transistor M2 becomes non-conductive.

At (7), the drive reference voltage VP exceeds the threshold voltage VREF. The gate voltage VM2G stays at a low level even if the control input signal has transited from a high level to a low level.

As was described in detail in the above text, according to the step-down DC-DC converter 1A directed to the first embodiment, overshoot of the output voltage V0, rising of the output voltage V0 up to a voltage level as high as the battery voltage PVDD and production of a through current flowing to the main switching transistor and the synchronous rectifier transistor can be prevented from occurring at start-up of the step-down DC-DC converter 1A by using a simple circuit configuration.

Second Embodiment

Figure 4:
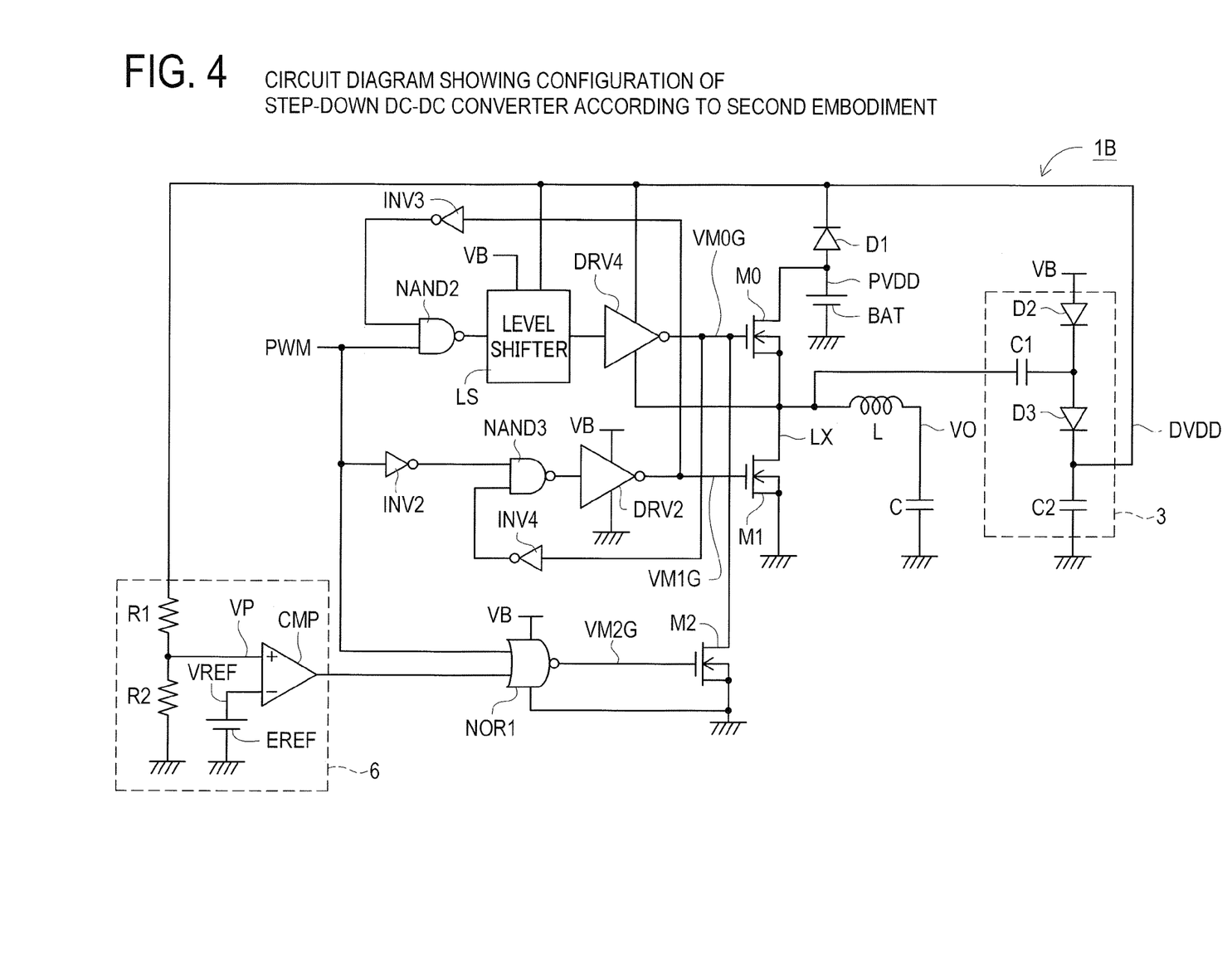
FIG. 4 is a circuit diagram showing a configuration of the step-down DC-DC converter according to a second embodiment.

FIG. 4 is a circuit diagram showing a configuration of a step-down DC-DC converter 1B according to a second embodiment. The step-down DC-DC converter 1B has a through current preventing-type (AST: Anti Shoot Through) drive circuit in which a main switching transistor M0 is made conductive when the synchronous rectifier transistor M1 is non-conductive, and the synchronous rectifier transistor M1 is made conductive when the main switching transistor M0 is non-conductive. The step-down DC-DC converter 1B differs from the step-down DC-DC converter 1A of the first embodiment in that it does not have the AND gate AND1, the delay element DL2, the inverter INV1, the NAND gate NAND1, the delay element DL2 and the driver DRV1, but it has a NAND gate NAND2, a NAND gate NAND3, inverters INV2 through INV4 and a driver DRV4. The following description will focus on the above-described differences, while description on the same configuration will be simplified or omitted.

In the AST-type drive circuit, the NAND gate NAND2 is connected to a control input signal PWM at one end of its input terminals, and to the output of the inverter INV3 at the other end of its input terminals. The output of the NAND gate NAND2 is connected to the driver DRV4 through a level shifter LS. The output of the driver DRV4 is connected to a gate of the main switching transistor M0 and to an input of the inverter INV4.

Further, in the AST-type drive circuit, the inverter INV2 has a control input signal PWM connected to its input, and the NAND gate NAND3 has one end of its inputs connected to an output of the inverter INV2. The NAND gate NAND3 has the other end of its inputs connected to an output of the inverter INV4 and an input of the driver DRV2 connected to its output. An output of the driver DRV2 is connected to a gate of the synchronous rectifier transistor M1 and to an input of the inverter INV3.

With the above circuit configuration, since one end of the input of the NAND gate NAND2 becomes at a low level, the gate voltage VMOG of the main switching transistor M0 does not become a high level as long as the gate voltage VM1G of the synchronous rectifier transistor M1 is maintained at a high level, even if the control input signal PWM transits from a low level to a high level. On the other hand, since one end of the inputs of the NAND gate NAND3 becomes a low level, the gate voltage VM1G of the synchronous rectifier transistor M1 does not become a high level as long as the gate voltage VMOG of the main switching transistor M0 is maintained at a high level, even if the control input signal PWM transits from a high level to a low level. It is thus possible to prevent a through current generated when the main switching transistor M0 and the synchronous rectifier transistor M1 become conductive at the same time.

Figure 5:
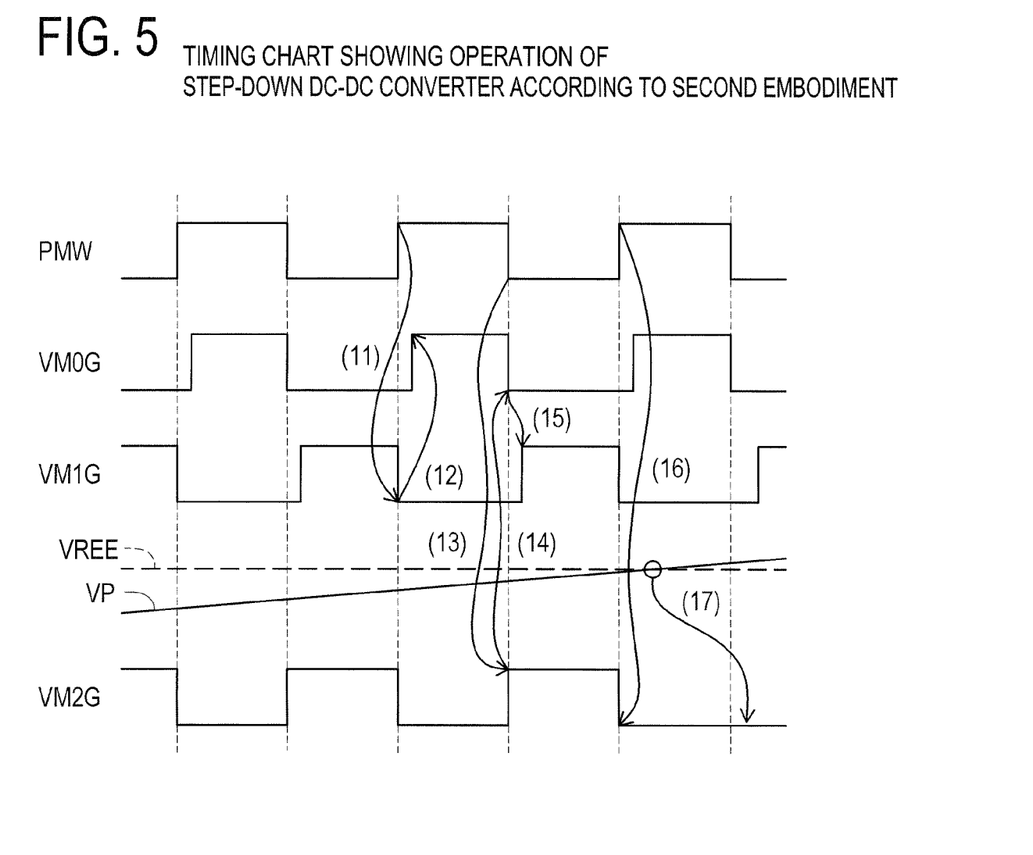
FIG. 5 is a timing chart showing an operation of the step-down DC-DC converter according to a second embodiment.
Figure 6:
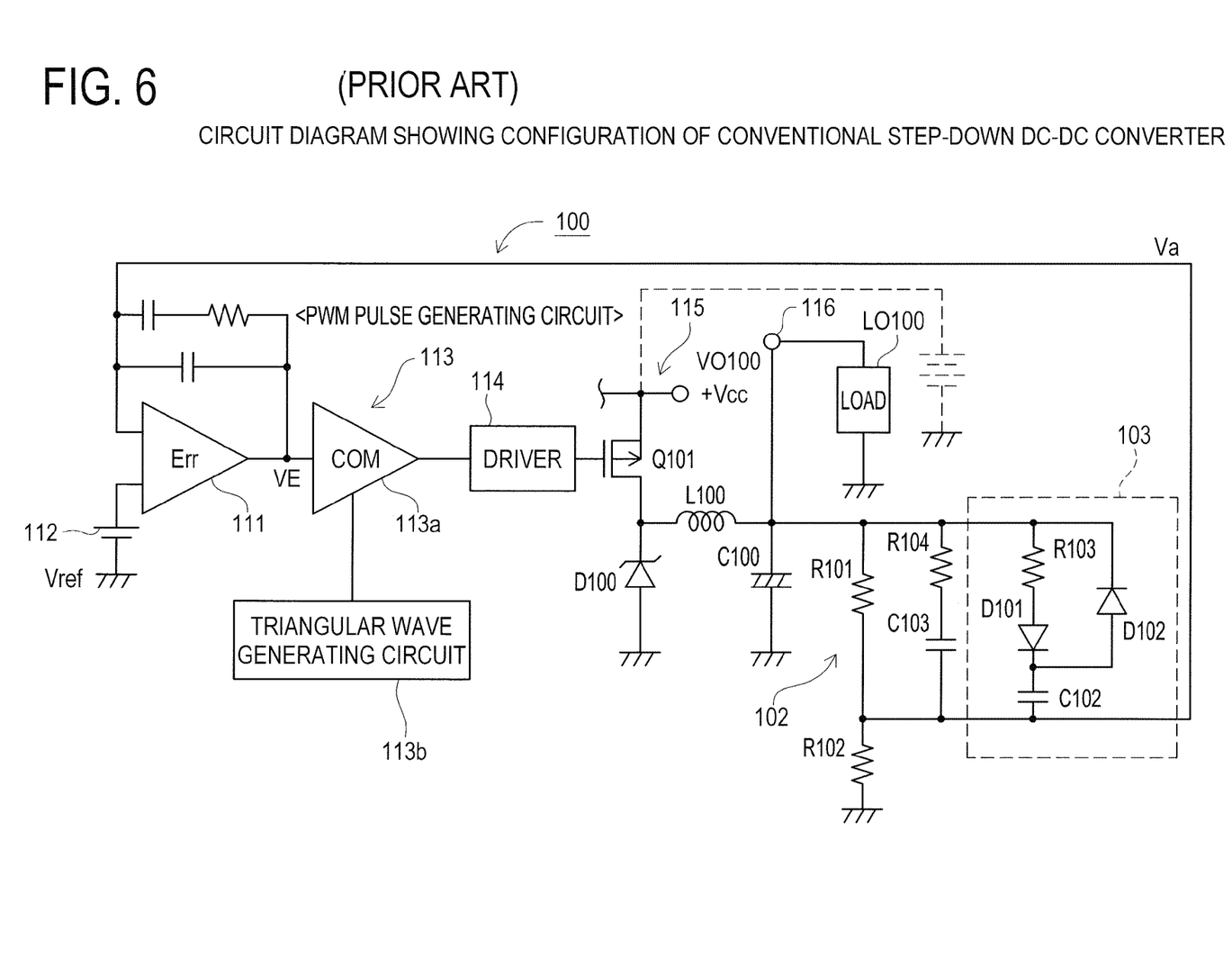
FIG. 6 is a circuit diagram showing a configuration of a conventional step-down DC-DC converter.

Next, the operation of the step-down DC-DC converter 1B will be described. FIG. 5 is a timing chart showing an operation of the step-down DC-DC converter 1B according to the second embodiment.

At (11), when the control input signal PWM transits from a low level to a high level, the gate voltage VM1G of the synchronous rectifier transistor M1 transits from a high level to a low level, so that the synchronous rectifier transistor M1 becomes non-conductive.

At (12), since the control input signal PWM transits from a low level to a high level and the gate voltage VM1G of the synchronous rectifier transistor M1 is at a low level, the gate voltage VMOG of the main switching transistor M0 transits from a low level to a high level, so that the main switching transistor M0 is made conductive. As a result, a battery voltage PVDD of the battery BAT is applied to coil L.

At (13), since the drive reference voltage VP falls below the threshold voltage VREF, the gate voltage VM2G of the MOS transistor M2 transits from a low level to a high level in response to the transition of the control input signal PWM from a high level to a low level.

At (14), since the gate voltage VM2G transits from a low level to a high level, the MOS transistor M2 becomes conductive and the gate voltage VMOG of the main switching transistor M0 transits from a high level to a low level. This makes it possible to prevent overshoot of the output voltage at start-up in the step-down DC-DC converter 1B of the second embodiment.

At (15), since the control input signal PWM transits from a high level to a low level and the gate voltage VMOG of the main switching transistor M0 is at a low level, the gate voltage VM1G of the synchronous rectifier transistor M1 transits from a low level to a high level, so that the synchronous rectifier transistor M1 becomes conductive. As a result, the slope of the current flowing to the coil L is reversed.

At (16), when the control input signal PWM transits from a low level to a high level, the gate voltage VM2G of the MOS transistor M2 becomes low level, so that the MOS transistor M2 becomes non-conductive.

At (17), the drive reference voltage VP exceeds the threshold voltage VREF. As a result, the gate voltage VM2G is maintained at a low level even if the control input signal PWM transits from a high level to a low level.

As was described in detail in the above text, in the step-down DC-DC converter 1B according to the second embodiment, overshoot of the output voltage V0 and rising of the output voltage V0 up to a voltage level as high as the battery voltage PVDD can be prevented from occurring at start-up of the step-down DC-DC converter 1B by employing a simple circuit configuration.

As another means to solve the above problems there is provided a step-down DC-DC converter in which a main switching transistor is constituted of a NMOS transistor, the step-down DC-DC converter comprising a MOS transistor connected between a gate of the main switching transistor and a ground potential, and operable to become conductive in response to an OFF command from the main switching transistor.

As yet another means to solve the above problems, there is provided a control method of a step-down DC-DC converter in which a main switching transistor is constituted of a NMOS transistor, the control method of the step-down DC-DC converter comprising a step of issuing an OFF command of the main switching transistor, and a step of establishing conductivity between a gate of the main switching transistor and a ground potential in response to the OFF command from the main switching transistor.

In the control circuit of the step-down DC-DC converter, the step-down DC-DC converter and the control method thereof according to the disclosure, the MOS transistor becomes conductive and the gate of the main switching transistor and the ground potential become conductive in response to an OFF command from the main switching transistor. Accordingly, the main switching transistor can be immediately made non-conductive upon start-up of the step-down DC-DC converter. Thus, according to the disclosure, an overshoot of the output voltage, rising of the output voltage up to a voltage level as high as the battery voltage and production of a through current flowing to the main switching transistor and the synchronous rectifier transistor can be prevented from occurring at start-up of the step-down DC-DC converter by employing a simple circuit configuration.

According to the disclosure, it is therefore possible to provide a control circuit for a step-down DC-DC converter, a step-down converter, and a control method thereof which can prevent overshoot, rising of the output voltage up to a voltage level as high as the battery voltage and production of a through current flowing to the main switching transistor and the synchronous rectifier transistor by employing a simple circuit configuration.

Although a description was given in the second embodiment of an AST-type step-down DC-DC converter 1B constituted of an inverter INV3 and an inverter INV4, the disclosure is not limited to this, and needless to say, the disclosure can be similarly applied to a configuration in which a delay element is connected to the inverter INV3 and the inverter INV4.

Inverter INV3 is one example of a first delay unit, inverter INV4 is one example of a second delay unit, charge pump circuit 3 is one example of a driving voltage generating unit and NOR gate NOR1 is one example of a control unit.

What is claimed is:

1. A control circuit of a step-down DC-DC converter comprising a main switching transistor corresponding to an NMOS transistor,
   wherein the step-down DC-DC converter comprises:
   a MOS transistor, coupled between a gate of the main switching transistor and a ground potential, conducts in accordance with an OFF command of the main switching transistor;
   a driver driving the gate of the main switching transistor by drive voltage of which high level input to be inputted into the gate of the main switching transistor is higher than input voltage to be inputted into a drain of the main switching transistor;
   a detection unit detecting that the drive voltage is lower than a predetermined level; and
   a control unit bringing the MOS transistor into conduction by the OFF command of the main switching transistor in accordance with a detection result of the detection unit,
   wherein the main switching transistor is turned on by the drive voltage.

2. The control circuit of the step-down DC-DC converter according to claim 1, wherein a ground-side terminal of the driver is coupled to a source of the main switching transistor.

3. The control circuit of the step-down DC-DC converter according to claim 1, further comprising:
   a synchronous rectification transistor.

4. The control circuit of the step-down DC-DC converter according to claim 3, further comprising:
   a first delay unit delaying a conduction control of the main switching transistor in accordance with an OFF command of the synchronous rectification transistor; and
   a second delay unit delaying a conduction control of the synchronous rectification transistor in accordance with the OFF command of the main switching transistor.

5. A step-down DC-DC converter comprising a main switching transistor corresponding to an NMOS transistor,
   wherein the step-down DC-DC converter further comprises:
   a MOS transistor, coupled between a gate of the main switching transistor and a ground potential, conducts in accordance with an OFF command of the main switching transistor;
   a driver driving the gate of the main switching transistor by drive voltage of which high level input to be inputted into the gate of the main switching transistor is higher than input voltage to be inputted into a drain of the main switching transistor;
   a detection unit detecting that the drive voltage is lower than a predetermined level; and
   a control unit bringing the MOS transistor into conduction by the OFF command of the main switching transistor in accordance with a detection result of the detection unit,
   wherein the main switching transistor is turned on by the drive voltage.

6. The step-down DC-DC converter according to claim 5, further comprising:
   a drive voltage generating unit generating the drive voltage.

7. The step-down DC-DC converter according to claim 5, wherein a ground-side terminal of the driver is connected to a source of the main switching transistor.

8. The step-down DC-DC converter according to claim 5, further comprising:
   a synchronous rectification transistor.

9. The step-down DC-DC converter according to claim 8, further comprising:
- a first delay unit delaying a conduction control of the main switching transistor in accordance with an OFF command of the synchronous rectification transistor; and
- a second delay unit delaying a conduction control of the synchronous rectification transistor in accordance with the OFF command of the a main switching transistor.

10. A control method of a step-down DC-DC converter comprising a main switching transistor corresponding to an NMOS transistor, the control method comprising:
- issuing an OFF command of the main switching transistor;
- generating a path between a gate of the main switching transistor and a ground potential by conduction of a MOS transistor in accordance with the OFF command of the main switching transistor;
- driving the gate of the main switching transistor in which a high level input of drive voltage to be inputted into the gate of the main switching transistor is made higher than input voltage to be inputted into a drain of the main switching transistor;
- detecting that the drive voltage is lower than a predetermined level; and
- bringing the MOS transistor into conduction by the OFF command of the main switching transistor in accordance with a result of the detecting, wherein the main switching transistor is turned on by the drive voltage.

11. A step-down DC-DC converter comprising:
- a first transistor comprising a first drain coupled to a first potential line and a first source coupled to an inductor;
- a first driver driving a first gate of the first transistor by a first drive voltage, a potential of the first drive voltage being higher than the potential of the first potential line;
- a second transistor, which forms a bath between the first gate of the first transistor and a second potential line by conduction, comprising a second drain coupled to the first gate of the first transistor and a second source coupled to a second potential line, a potential of the second potential line being lower than a potential of the first potential line; and
- a second driver driving a second gate of the second transistor by a second drive voltage which changes in opposite phase with the first drive voltage, wherein a conductivity type of the second transistor is same as a conductivity type of the first transistor.

* * * * *